Aug. 24, 1943.  A. S. KROTZ  2,327,909
SECTIONAL TRACK BLOCK
Filed Oct. 17, 1942
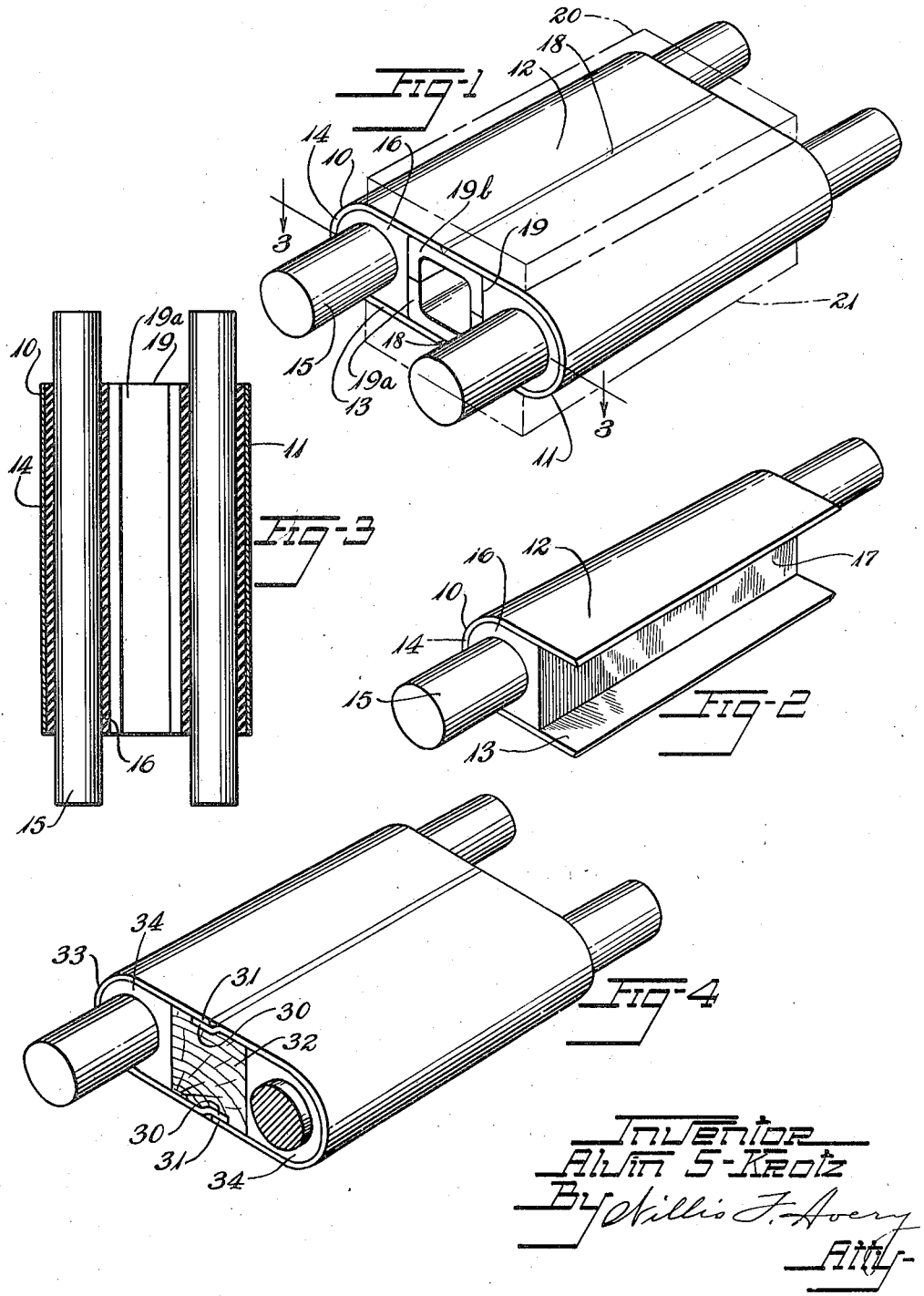

Patented Aug. 24, 1943

2,327,909

UNITED STATES PATENT OFFICE 2,327,909

SECTIONAL TRACK BLOCK

Alvin S. Krotz, Akron, Ohio, assignor to The B. F. Goodrich Company, New York, N. Y., a corporation of New York Application October 17, 1942, Serial No. 462,331

5 Claims. (Cl. 305—10)

This invention relates to blocks for articulated tracks such as are used for example on military tanks and other endless track vehicles, and has reference especially to a block that can be constructed in sections.

The chief objects of the invention are to provide for simplification in the construction and assembly of the block, to provide at the same time for strength of the block to withstand the severe stresses of load and impact encountered in use.

These and further objects will be apparent from the following description, reference being had to the accompanying drawing in which:

Fig. 1 is a perspective view of a track block constructed in accordance with and embodying the invention, optional tread elements being indicated in broken lines.

Fig. 2 is a perspective view of one of the end sections of the block.

Fig. 3 is a section taken along the line 3—3 of Fig. 1.

Fig. 4 is a perspective view of a modified construction, parts being broken away and in section.

The track block of the illustrative embodiments of the invention shown in the drawing includes a pair of end sections each having top and bottom walls terminating at one end in an end wall and at the other in an open end, the two sections being constructed independently and being assembled in the block with the open ends facing each other. Provision is made for housing a pin or other connector member extending through each end section together with a body of resilient rubber or other rubber-like material embracing the connecting member and separating it from the top, bottom and end walls in a manner to act as a resilient bushing for accommodating twisting movement of the connector member. This sectional construction greatly facilitates manufacture, and assembly may be effected as by welding or otherwise securing together the sections while they are held in position preferably with the body of resilient material held in a state of compression against the end walls and connecting members. A filler structure may be included between the bushings and between the top and bottom walls for reinforcement of the block in its central region and for holding the resilient bushings in their compressed condition.

With reference to the embodiment of the invention shown in Figs. 1 to 3 of the accompanying drawing, two end sections 10 and 11 are provided. These may be identical and of the construction shown independently in Fig. 2. A frame part, which may be of steel in sheet or plate form, is bent to a generally U shape to provide a top wall 12 and bottom wall 13 joined by a curved end wall 14 and presenting an opposite open end. A connector pin 15 extends transversely through the space between said wall portions with the ends of the connector pin protruding for connection of the track block to adjacent track blocks by means of links. A bushing 16 of resilient rubber or other rubber-like material embraces the pin 15 and fills the space between it and the walls 12, 13 and 14, but preferably terminates in a face 17 short of the open end of the section. The resilient bushing 16 may be independently molded and then positioned in the section, but preferably is molded directly in the U-shaped frame element, and may be bonded by vulcanization both to the pin 15 and to the walls 12, 13 and 14 of the frame element so as to provide the section as an integral unit and have the advantages of added resistance to outward bulging of the resilient material at the sides of the track block under severe compression of the resilient material between the pin 15 and the wall 14 when the track is subjected to heavy tension.

The sections 10 and 11 may be assembled end to end with the open walls 12 and 13 in abutment as shown in Fig. 1 and welded together along the seam 18. A filler structure 19 preferably is included between the top and bottom walls to increase the support in the central region of the block and to engage the open end faces of the resilient bushings and crowd them against the end walls of the frame structure. Assembly may be effected by welding, riveting or otherwise uniting the parts where they are held together in the assembled condition. The filler structure 19 may be composed of a pair of steel channel members 19a, 19b assembled with their open sides in facing relation as shown, or this filler structure may be of any other suitable construction such, for example, as a fabricated or solid construction, and may be of metal, wood or any other suitable material.

The surface of the block provided by the top walls 12 may be utilized directly as the track surface receiving the bogie, idler and driving wheels of the track, or if desired a pad indicated in the broken lines 20 may be added to the top face of the block for engaging the bogie and driving wheels, which pad may be of resilient rubber or other rubber-like material, or fabric or wood or any other suitable material secured to the block.

The bottom wall 13 may supply the tread face of the track, or for greater wearing life, or for increased traction, or both, a tread block indicated in broken lines at 21 may be secured to the bottom face of the block, which tread block may be of any suitable construction and material, such as rubber or other rubber-like material, fabric or wood, or even a steel cleat bolted or otherwise secured to the bottom face of the block.

In the embodiment of Fig. 4 the construction is like that hereinabove described except that the margins of the sections at their open ends are assembled in overlapping relation, one margin 30 of each section being depressed to provide an offset for receiving the mating margin 31 in flush relation of the block face, and in the form shown the filler block 32 is of wood filling the space between the top and bottom walls of the frame and compressing the bushings 34, 34.

The constructions herein described make possible the manufacture of each frame section and the bushing and connecting member all in one molding operation, the parts are kept to simple and easily worked shapes and assembly operations are greatly facilitated. At the same time a construction is provided that is strong and durable under the severe conditions of use so that the block will not be unduly distorted under the impact of the bogie and other wheels upon it or the rolling pressure of such wheels along the block.

Variations may be made without departing from the scope of the invention as it is defined in the following claims.

I claim:

1. A block for an articulated block track, said block comprising a pair of end sections, each section comprising a frame structure having top and bottom walls terminating in an end wall and an opposite open end, a connector member extending between said walls, and a body of resilient material embracing said connector member between the latter and said walls, said end sections being assembled with their open ends in facing relation.

2. A block as defined in claim 1 in which the top and bottom walls of the two sections are assembled in overlapping relation.

3. A block for an articulated block track, said block comprising a pair of end sections, each section comprising a frame structure having top and bottom walls terminating in an end wall and an opposite open end, a connector member extending between said walls, a body of resilient material embracing said connector member between the latter and said walls, said end sections being assembled with their open ends in facing relation, and a filler structure interposed between the bodies of resilient material of the assembled end sections and compressing the resilient material against said end walls.

4. A block for an articulated block track, said block comprising a pair of end sections, each section comprising a metallic frame structure generally U-shaped in cross-section having top and bottom walls terminating in an end wall and an opposite open end, a connector member extending between said walls, and a body of resilient rubber-like material embracing said connector member between the latter and said walls and bonded by vulcanization to the connector member and to said walls, the open ends of the top and bottom walls extending beyond said body and said end sections being assembled with their open ends in facing relation, and a filler structure substantially filling the space between the top and bottom walls and between said bodies and compressing the latter against said end walls and against said connector members.

5. A block section for an articulated block track, said block section comprising top and bottom walls terminating in an end wall and an opposite open end, a connector member extending between said walls, and a body of resilient material embracing said connector member between said walls and terminating short of the open end of the section.

ALVIN S. KROTZ.